UNITED STATES PATENT OFFICE.

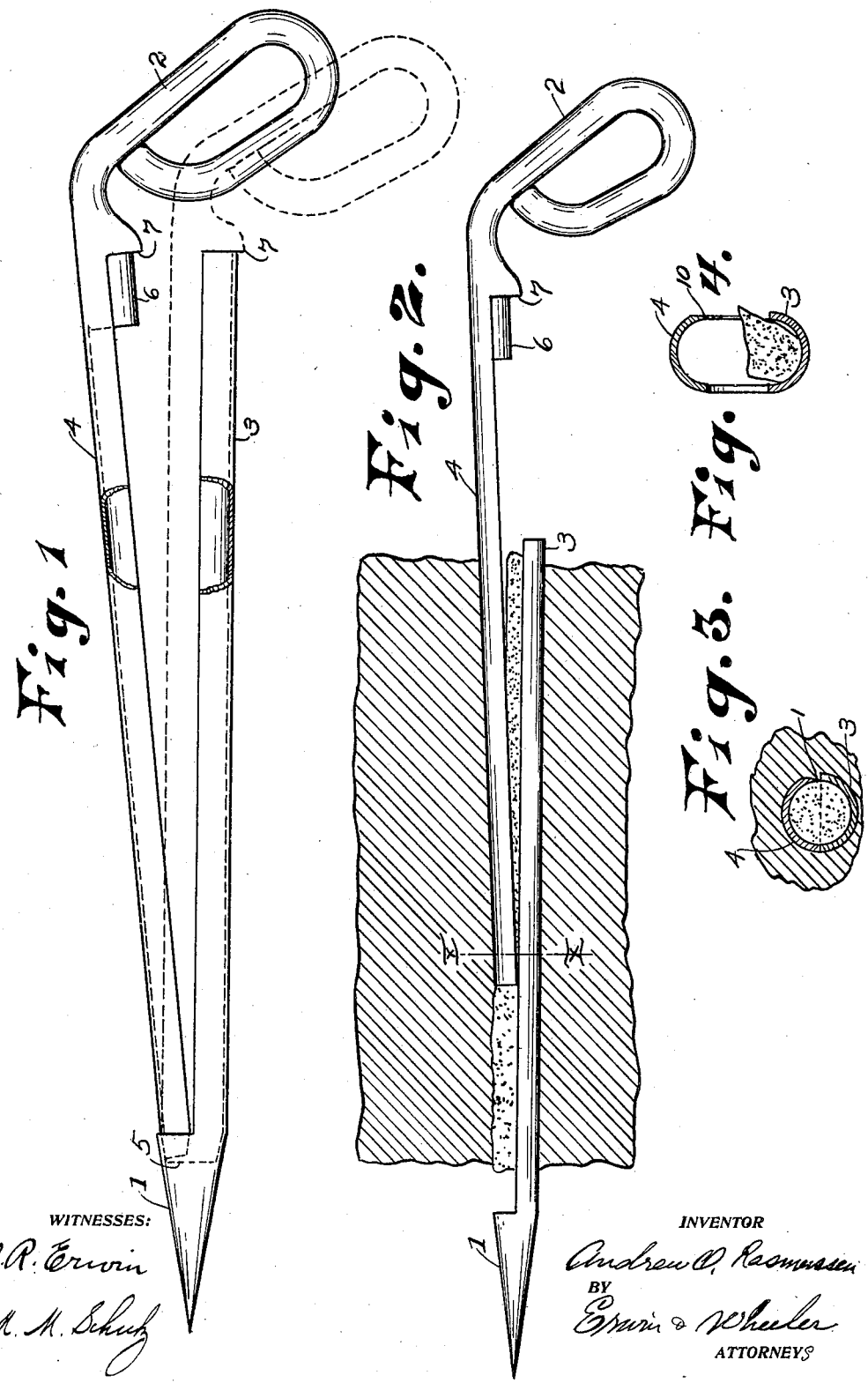

ANDREW O. RASMUSSEN, OF STOUGHTON, WISCONSIN.

DEVICE FOR INSERTING FATS, &c., INTO MEATS.

No. 889,965.  Specification of Letters Patent.  Patented June 9, 1908.

Application filed July 20, 1907. Serial No. 384,681.

*To all whom it may concern:*

Be it known that I, ANDREW O. RASMUSSEN, a citizen of the United States, residing at Stoughton, county of Dane, and State of Wisconsin, have invented new and useful Improvements in Devices for Inserting Fats, &c., into Meats, of which the following is a specification.

My invention relates to improvements in devices for inserting fat, salt, etc., into meats.

The object of my invention is to provide an inexpensive tool of the designated class in which the fatty strip to be inserted need not be cut to exactly fit the tube, the strips being compressed when the tube sections are closed together and the surplus cut off. Also to provide a tool in which the parts will be drawn out in opposite directions whereby the pull upon the material exerted by one withdrawing section is balanced by that of the other section to such an extent that both sections can be withdrawn from the material without shifting the latter from its position in the meat.

In the following description, reference is had to the accompanying drawings in which Figure 1 is a side view illustrating the position of the sections, preparatory to closing the same to position of use, and with dotted lines indicating the closed position. Fig. 2 is a side view of the sections as they are being withdrawn from a piece of meat, which is shown in section. Fig. 3 is a cross sectional view drawn on line $x$—$x$ of Fig. 2, showing the sections in closed position. Fig. 4 is a sectional view drawn substantially through the center of the device with the parts in the position of Fig. 1, and showing a strip of fat in position preparatory to closing the sections thereon.

Like parts are identified by the same reference characters throughout the several views.

The tool is divided longitudinally between a point 1 and a handle 2, into two separable semi-cylindrical sections 3 and 4 respectively. The section 4 is formed to enter a socket 5 in the point as shown by dotted lines in Fig. 1, and near the handle end it is provided with a member 6 which is adapted to fit into the end portion of the section 3 when the sections are in closed position, with the end of the section 3 abutting a shoulder 7 on the handle portion of section 4.

In use, a strip of fat is cut and laid in the concave groove of the section 3. The free end of section 4 is then inserted in the socket 5 as shown in Fig. 1 and the sections brought together as indicated by dotted lines in said figure. One side of the section 4 is formed with a cutting edge 10, (see Figs. 3 and 4) and the material is so disposed in section 3 that the edge 10 will cut off the surplus as it closes down upon the opposing edge of section 3, the fat being compressed into the cylindrical space to a considerable degree less than its normal volume.

The sections having been closed upon each other, the pointed end is inserted and driven through the meat, when, by grasping the point at one side of the meat and the handle at the other side, the sections may be drawn out on opposite sides. They are preferably separated vertically by lifting upon the handle and point during the withdrawing operation since this tends to separate the metallic surface from the fat and allows the latter to frictionally contact with the meat at the beginning of the withdrawing operation.

It will of course be understood that the described tool may be employed to insert salt or other material into meats, vegetables, etc. Also that while I have described the sections as semi-cylindrical, the precise form is not material if, one or both of the sections are longitudinally channeled to receive the material to be inserted.

Having thus described my invention what I claim as new and desire to secure by Letters Patent is,

A tool of the described class, comprising a needle shaped member provided with an interior longitudinally extending cavity and divided longitudinally along its central axis, intermediate of its ends, into two separable sections, a socketed end portion on one of said sections adapted to loosely receive one end of the other section and having a pointed extremity, a handle portion at the outer end of the other section, unconnected with the pointed section, and provided with a shoulder opposing the inner end of the pointed section, whereby said sections may be initially separated at the handle end, both laterally and longitudinally;—one of said sections being provided with a cutting edge on one side along the line of division, adapted, when the sections are brought together with a shearing movement, to cut off projecting portions of the contents of said cavity.

In testimony whereof I affix my signature in the presence of two witnesses.

ANDREW O. RASMUSSEN.

Witnesses:
ERLING K. LOVERUD,
AMY OLSEN.